Patented Nov. 13, 1923.

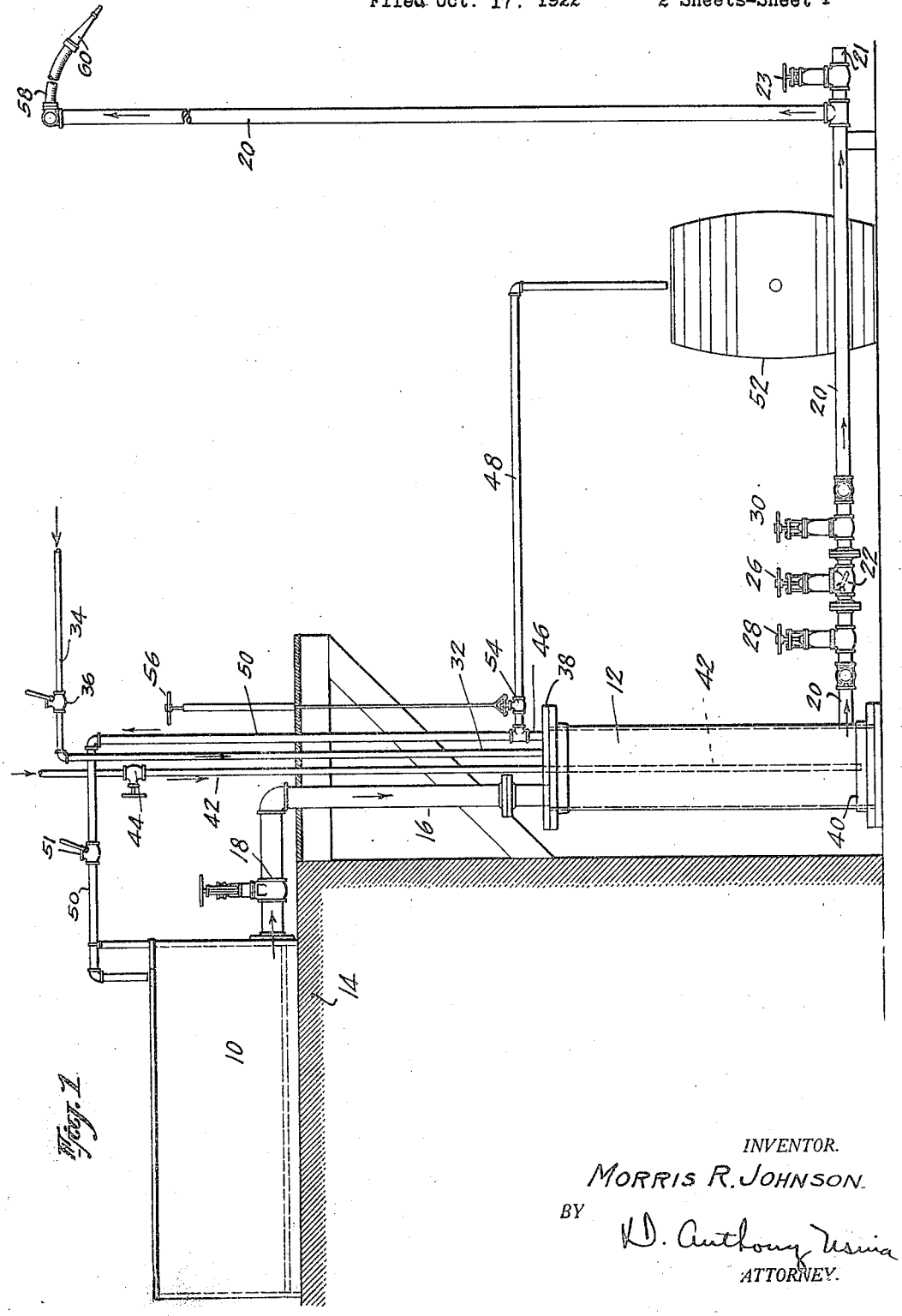

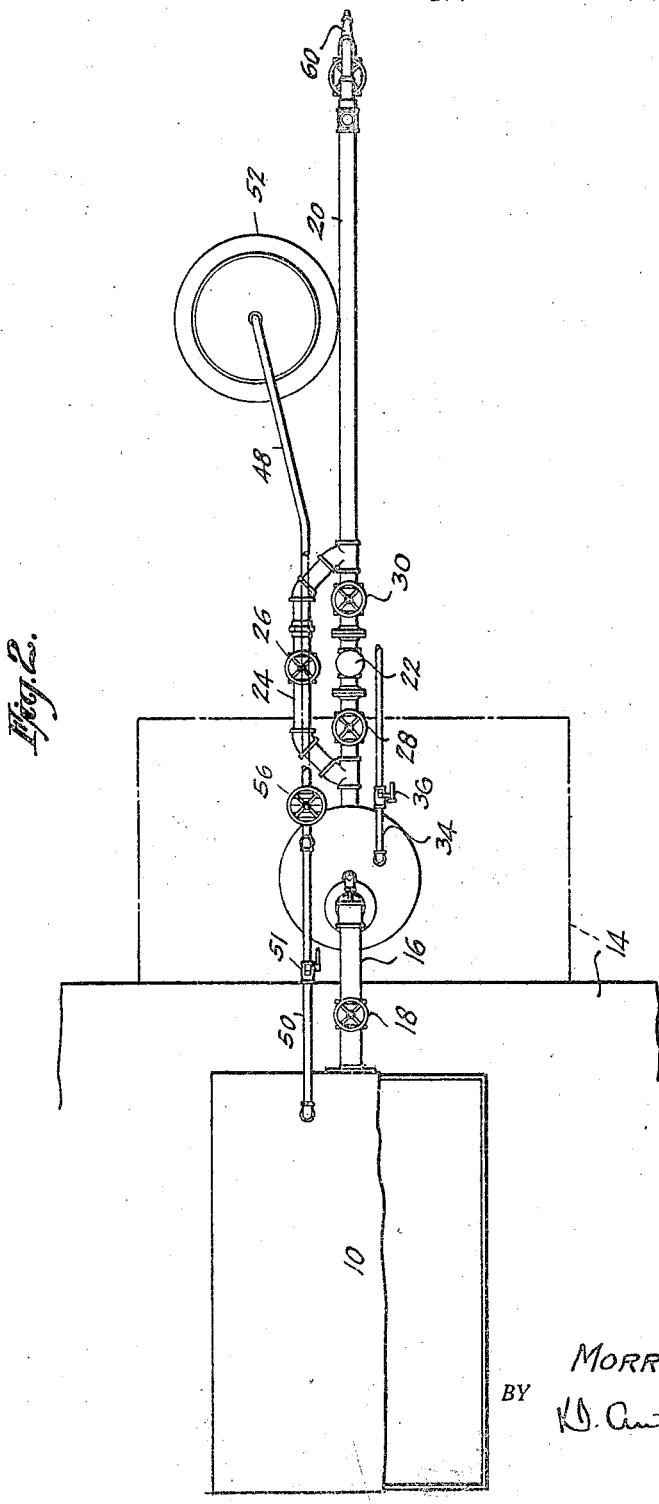

1,473,958

UNITED STATES PATENT OFFICE.

MORRIS R. JOHNSON, OF BIRMINGHAM, ALABAMA.

APPARATUS FOR CONVEYING PLASTIC MATERIAL.

Application filed October 17, 1922. Serial No. 595,210.

*To all whom it may concern:*

Be it known that I, MORRIS R. JOHNSON, a citizen of the United States, residing at Birmingham, in the county of Jefferson, State of Alabama, have invented certain new and useful Improvements in Apparatus for Conveying Plastic Material, of which the following is a specification.

My invention relates to an apparatus including a mixing box in which is placed the clay or any other material to be conveyed to some remote point either above or below the mixing box, an air cylinder and the necessary piping for charging and discharging the material.

An embodiment of the invention is illustrated in the accompanying drawings in which—

Fig. 1 is a side elevation of the entire apparatus, and Fig. 2 is a plan view thereof.

The apparatus includes a mixing box 10 and an air cylinder 12, the mixing box preferably being set at a position higher than the air cylinder on an operating platform 14. The mixing box and air cylinder are connected by supply pipe 16 in which is placed a valve 18. To the bottom of the air cylinder 12 is connected a discharge pipe 20 to which is secured check valve 22. Around the check valve 22 a by-pass 24 is connected which is equipped with a valve 26 and this by-pass is connected around the valves 28 and 30 as shown in Fig. 2. A drain pipe 21 controlled by a valve 23 is connected to the pipe 20 to permit the apparatus to be flushed out when necessary. At the top the air cylinder is connected by a pipe 32 to a high pressure air line 34 which is controlled by a valve 36. Extending through the top 38 of the air cylinder, but running nearly to its bottom 40, is a steam pipe 42 provided with a valve 44. A return line 46 is connected to the top of the air cylinder and communicates through pipes 48 and 50 to a waste barrel 52 and the mixing box 10 respectively.

In operation the valve 18 in the pipe line 16 is closed while the clay or other material is mixed to a plastic condition in mixing box 10. After proper mixing, the valve 18 is opened allowing material to flow by gravity into the air cylinder 12. A valve 54 in the pipe 48 is opened by turning the hand wheel 56 thus allowing material to flow through pipes 46 and 48 into the barrel 52 after the air cylinder is filled. When the operator sees material flowing into the barrel he closes valves 18 and 54.

The discharge line 20 is installed to the remote point where the material is required, such as to the top of a blast furnace where fire-clay is frequently needed for repairing the brick lining or other parts of the furnace. A suitable hose 58 and nozzle 60 may be connected to the pipe 20 to direct the material discharged. Valve 36 in the air line 34 which is connected to a compressed air supply line is now opened and the material is thus forced out through the pipe line 20. The check valve 22 between the two gate valves 28 and 30 prevents the material from flowing back through the pipe 20 into the air cylinder when the air pressure is taken off for refilling the air cylinder. The two gate valves 28 and 30 on each side of the check valve are normally left open.

If this check valve 22 gets out of order the valves 28 and 30 on each side of it are closed and by the by-pass 24 is used until the check valve is repaired. In the event that the material packs too tight in the air cylinder a small amount of steam is discharged at the bottom of the cylinder by opening valve 44 in the steam line 42, this agitates the material keeping it hot at all times since it is advantageous to use hot fire-clay for repairing blast furnace or other heavy brick linings. To release this steam or air a normally closed valve 51 in line 50 is opened thus allowing air or fire-clay mist, caused by the rush of air when pressure is released, to flow back into the mixing box.

My apparatus is an improvement over piston pumps heretofore used for the purpose, and also possesses advantages which will be apparent to those skilled in the art over conveyers used for handling concrete in building construction.

Though I have described with great particularity the details of the embodiment of the invention illustrated it is not to be construed that I am restricted to the use of such a structure. Various modifications may be made by those skilled in the art without departing from the invention as defined in the appended claims.

What I claim is:

1. In an apparatus of the class described, a box in which plastic material to be conveyed is mixed and stored, a cylinder communicating with said box, means for controlling the passage of said plastic material between the box and the cylinder, means for applying fluid pressure to the material in said cylinder to discharge it therefrom, piping connected to said cylinder to convey the material to a remote discharge point and means to indicate to the operator that the cylinder has been charged to full capacity.

2. In an apparatus of the class described, a box in which the material to be conveyed is mixed and stored, a cylinder communicating with said box, means for controlling the passage of material between the box and the cylinder, means for applying fluid pressure to the material in said cylinder to discharge it therefrom, means for delivering a jet of steam to the lower part of the cylinder to heat the plastic material to prevent it from congealing, and piping connected to said cylinder to convey the material to a remote discharge point.

3. In an apparatus of the class described, a storage box for plastic material, an air cylinder located below said box so that the material can flow by gravity thereto, a pipe connecting said storage box and said cylinder, a valve for controlling communication between said box and said cylinder, means for exerting fluid pressure directly on the material in the cylinder to discharge it at a remote point, discharge piping for conveying the material, a pipe for discharging steam within the cylinder to heat the charge and keep it plastic, and a valve controlled pipe connected to the top of the cylinder and communicating with said storage box adapted to serve as a vent for discharging the material laden steam mist to the storage box after the cylinder has discharged its contents.

4. In an apparatus of the class described, a box for holding a supply of plastic material, a cylinder connected thereto, means controlling communication between the box and the cylinder, means for supplying compressed air to the cylinder to discharge the material, a discharge pipe connected to said cylinder and having a check valve to prevent back flow of the material, a by-press around said check valve and valves for controlling the flow of material through said by-pass so that if the check valve becomes clogged the opening of said last named valves will permit the interrupted discharge of material.

5. In an apparatus of the class described, a box for holding a supply of plastic material, a cylinder connected thereto, means controlling communication between the box and the cylinder, means for supplying compressed air to the cylinder to discharge the material, a discharge pipe connected to said cylinder adapted to discharge the material at a remote point and a valve controlled outlet pipe connected to the top of the cylinder adapted to permit the material to overflow momentarily to indicate to the operator that the cylinder has been charged to full capacity from the storage box.

In witness whereof, I have hereunto signed my name.

MORRIS R. JOHNSON.